United States Patent Office 3,270,005
Patented August 30, 1966

3,270,005
PHOSPHINIC ACID DERIVATIVES
Arthur P. Ingram, Jr., Lake Jackson, Tex., assignor to The Dow Chemical Company, Midland, Mich., a corporation of Delaware
No Drawing. Filed July 15, 1963, Ser. No. 295,198
2 Claims. (Cl. 260—239)

This invention relates to new compositions of matter and to methods of preparing such compositions. More particularly, this invention relates to compounds which contain at least four aziridinyl groups with at least one phosphorus atom for every pair of aziridinyl groups, and to a process for preparing such compounds.

Compounds which contain two or three aziridinyl groups attached to a phosphorus atom are known in the literature. For example, tris-(1-aziridinyl)phosphine oxide is disclosed in U.S. Patent 3,034,919 to Steinhauer. Compounds which contain two aziridinyl groups attached to a single phosphorus atom are disclosed in U.S. Patent 2,606,901 to Parker et al. In these latter compounds, however, only one phosphorus atom is present in the molecule. Polyphosphorus compounds such as pyrophosphorotetramides are disclosed in U.S. Patent 2,717,249 to Toy et al.

The compounds of this invention may be represented by the formula

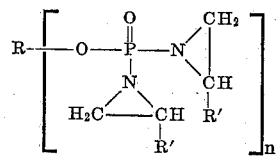

wherein R is an organic group having a valence of $n$ composed only of carbon and hydrogen or carbon, hydrogen and oxygen, $n$ represents an integer from 2 to 8, each R' may be the same or different and each R' represents a hydrogen atom or a hydrocarbon group of from 1 to 10 carbon atoms. In these compounds, the phosphorus-containing groups are separated by at least 4 carbon atoms. When R' is a hydrocarbon group, each R' may be a lower alkyl group of from 1 to 4 carbon atoms (such as methyl, ethyl, n-propyl, i-propyl, n-butyl, i-butyl, sec.-butyl and t-butyl), a cycloalkyl group (containing at least 4 carbon atoms) such as cyclobutyl, cyclopentyl and cyclohexyl, or each R' may be an aryl, alkyl-substituted aryl or aralkyl group such as a phenyl, tolyl, xylyl, cumyl, phenethyl, benzyl or a duryl group.

Suitable R groups include meta- and para-arylene groups of from 6 to 10 carbon atoms such as phenylene, tolylene, cumylene and durylene, alkylene groups of from 4 to 10 carbon atoms (for example, divalent butylene, pentylene and hexylene groups), trivalent groups derived from polyols, such as alkylene oxide adducts of glycerine, by removal of three OH groups, tetravalent groups derived from tetrols by removal of four OH groups, divalent and trivalent groups derived from polyalkylene oxide polyols by removal of two to eight hydroxyl groups (such as groups derived, respectively, from diethylene glycol and the adduct formed by reacting eight moles of ethylene oxide with one mole of sucrose). Other polyols which form suitable R groups when the hydroxyl radicals are removed include the glycerine and ethylene glycol adducts formed by reaction of these polyols with at least one mole of styrene oxide. Polyol-alkylene oxide adducts are formed by reacting from 1 to 460 moles of alkylene oxide per mole of polyol. R groups derived from such adducts by removal of from 2 to 8 hydroxyl groups may contain up to 1000 carbon atoms.

The compounds of the invention are prepared by reacting a diol, triol, tetrol, pentol or polyol with up to eight hydroxyl groups with a phosphorus oxyhalide to form an intermediate with from two to eight phosphorus atoms in the molecule. The intermediate need not be isolated and is preferably reacted in situ with ethyleneimine to form a compound with from 2 to 8 phosphorus atoms and two aziridinyl groups for each phosphorus atom in the molecule. The process may be illustrated by the following equation

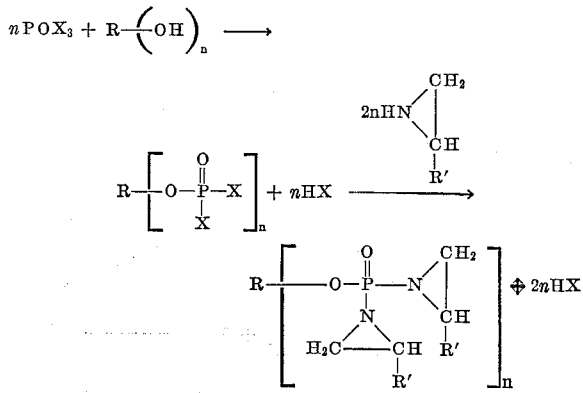

wherein $n$ is 2 to 8, each X represents a halogen (which may be the same or different and is preferably bromine or chlorine), R' is a hydrogen atom or lower alkyl group and R is a divalent, trivalent or tetravalent group as previously defined. Typical examples of this general reaction include the following:

(1)

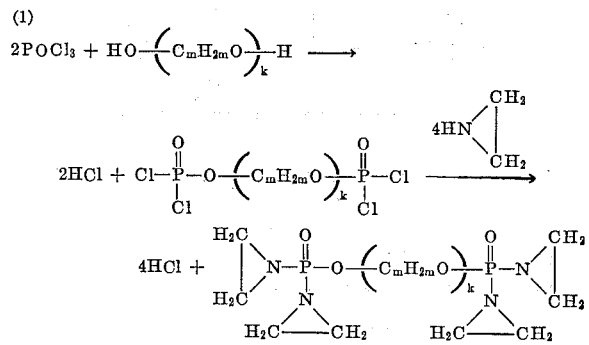

wherein $m$ represents an integer from 2 to 4 and $k$ is an integer from 2 to 460. The compounds

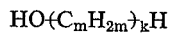

are obtained by condensing an appropriate number of moles of an alkylene oxide (such as ethylene oxide, propylene oxide or butylene oxide) with a suitable diol (such as ethylene glycol, 1,3-propanediol, 1,4-butanediol, 1,3-butanediol or 2,3-butanediol). Such alkylene oxide-diol adducts may have molecular weights up to 20,000 depending upon the number of moles of alkylene oxide which are reacted with the diol. Similar alkylene oxide adducts may be obtained from triols (such as glycerine, 1,2,6-hexanetriol) and tetrols (such as pentaerythritol) as well as other polyols.

(2)
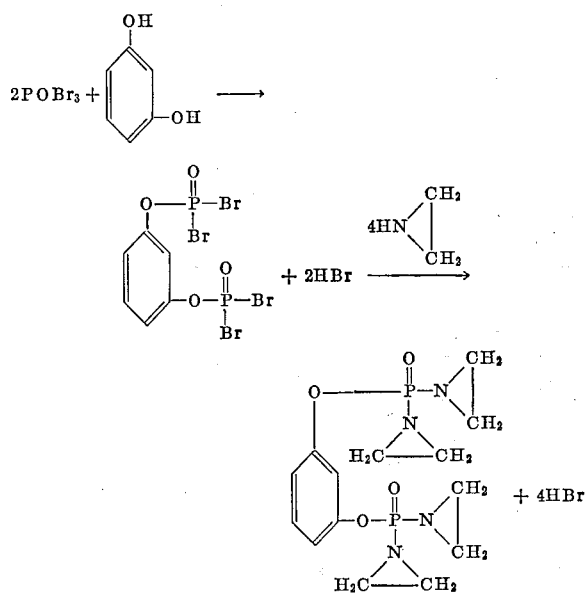

(3)
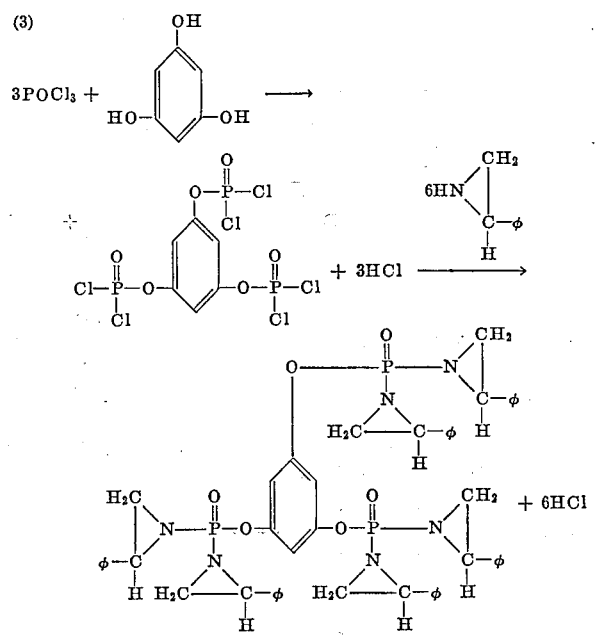

wherein —φ represents the phenyl radical (—C₆H₅). Other suitable aromatic polyols include n-hexyl-resorcinol, pyrogallol and pyrocatechol.

(4)
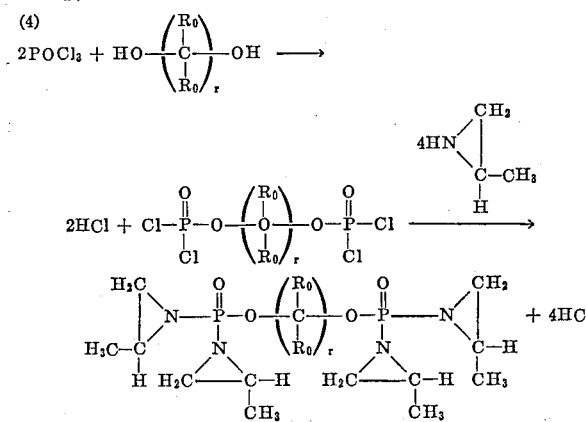

wherein $r$ represents an integer from 4 to 10 and each $R_0$ is independently selected from the group consisting of hydrogen and a lower alkyl group.

In a similar manner, compounds of the formula

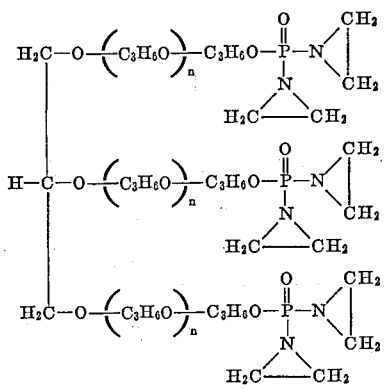

wherein $n$ is an integer from 1 to about 150, are prepared by reacting the corresponding oxypropylated glycerine with POCl₃, followed by in situ reaction of the intermediate so formed with ethyleneimine.

The reaction used to prepare the compounds of the invention is generally carried out in the presence of an acid acceptor such as ammonia, a tertiary amine or a typical base such as Na₂CO₃. The reaction may be carried out in various reaction media such as benzene, toluene, chlorinated hydrocarbons, chlorobenzene, ketones (such as acetone), linear ethers (such as diethyl ether) and cyclic ethers (such as tetrahydrofuran and 1,4-dioxane).

As shown by the preceding equations, one molecule of phosphorus oxyhalide (POX₃, X represents a halogen) must be available for every hydroxyl group in the polyol reactant. Mole ratios of from 2 to 4 moles of phosphorous oxyhalide per mole of diol, triol or tetrol are usually sufficient to furnish one molecule of POX₃ per hydroxyl group. With higher polyols (such as pentols and hexols), at least five or six moles of POX₃ is used. With sucrose, at least 8 moles of POX₃ should be used. An excess of POX₃ is preferred, but stoichiometric ratios may be used. Two moles of ethyleneimine reactant for every mole of phosphorous oxyhalide should be available during the reaction. This corresponds to one molecule of ethyleneimine for each halogen atom in the intermediate product. The mole ratio of the ethyleneimine to the polyol may vary from about 1 to about 16 or 17 moles of ethyleneimine per mole of polyol (diol, triol, tetrol or polyol with eight hydroxyl groups), so that two molecules of ethyleneimine are available for every hydroxyl group in the starting compound. The reactions may be carried out at temperatures of from about 2° to about 50° C., with temperatures from 5° to 40° C. being preferred. Temperatures of about 105° C. may be used when an aryl diol is reacted with POCl₃. When temperatures above about 40° C. are used, the final reaction product is degraded somewhat by the formation of by-products (usually dioxanes in the case of alkylene oxide diols). The reactions are not pressure sensitive and pressures of from a few hundredths of a millimeter of mercury up to several hundred atmospheres may be employed. Satisfactory results are obtained when the reaction is carried out at atmospheric pressure.

The compounds of the invention are useful as textile treating agents and may also be polymerized with Lewis acids to form useful films, adhesives and coherent coatings. When used to treat textiles to improve the hand and wrinkle resistance of the fabric, the compounds are employed in aqueous systems to impregnate the cloth, followed by curing at temperatures of from about 150° to 175° C. About 0.01–0.02 gram of aziridinyl units per gram of dry treated fabric is sufficient to give an improved wrinkle recovery angle to cotton gingham fabric.

The following examples are submitted for the purpose of illustration only and are not to be construed as limiting the scope of the invention in any way.

EXAMPLE I

Into a reaction vessel equipped with a means for stirring, temperature control and reactant addition was placed 168.3 grams of phosphorus oxychloride. The temperature was maintained at 25° C. and 53 grams of diethylene glycol was added dropwise over a one hour period. After all of the diethylene glycol was added, the mixture was digested for two hours at 25° C. Hydrogen chloride and unreacted POCl$_3$ were removed by distillation under reduced pressure. The resulting halogenated phosphate ester (C$_4$H$_8$Cl$_4$O$_5$P$_2$) was a pale yellow liquid and had a chlorine content of 40.1 percent (theory=41.8 percent). One-half 80.0 grams) of this ester was diluted with 400 milliliters of benzene and added dropwise to a reaction vessel containing a solution of 51.6 grams of ethyleneimine and 121.3 grams of triethylamine in 500 milliliters of benzene. The dropwise addition was completed in a one hour period at a temperature of 5° C. After completion of the addition, the mixture was digested for an additional hour at 5° C. The resulting slurry was passed through a filter to remove solid triethylamine hydrochloride. The filtrate was heated to evaporate benzene and any unreacted ethyleneimine and triethylamine. From this evaporation was obtained 65.8 grams (71.9 percent of the theoretical yield) of the bis(1-aziridinyl)-diethylene glycol diester of phosphinic acid identified as having the following formula:

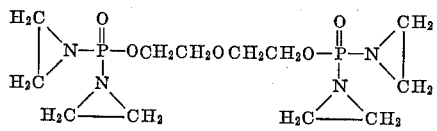

The compound was a pale yellow liquid having an aziridinyl content (as C$_2$H$_4$N) of 43.3 percent (by the method of Allen and Seaman, Analytical Chemistry, 27, page 540, (1955)). This method was used for all of the aziridinyl content analyses performed herein. The tetraaziridinyl product had a density of 1.295 g./ml. at 25° C. and a refractive index of 1.5066 at 24.5° C. (Na D line).

EXAMPLE II

Into a reaction vessel equipped as in Example I was placed 300 milliliters of 1.4-dioxane and 1.09 grams of phosphorus oxylchloride. The temperature was maintained at 20° C. and a solution containing 300 milliliters of 1,4-dioxane, 52.0 grams of triethylamine and 29.5 grams of 1,6-hexanediol was added dropwise over a one hour period. Upon completion of the addition, the mixture was digested for one-half hour. The mixture was filtered to remove solid triethylamine hydrochloride and the filtrate was placed under reduced pressure to remove 1,4-dioxane and any unreacted phosphorus oxychloride. The product (the 1,6-hexanediol diester of phosphorodichloridic acid) was an amber-colored liquid with a chlorine content of 38.1 percent by weight. This product 87.5 grams) was diluted with 200 milliters of benzene and added dropwise to a reaction vessel containing 500 milliliters of benzene, 55.0 grams of ethyleneimine and 120.0 grams of triethylamine. The reaction was carried out under eaxctly the same conditions as in Example I. After removal of the triethylamine hydrochloride and evaporation of the benzene and unreacted ethyleneimine, there was obtained 53.0 grams (56.4 percent of the theoretical yield) of:

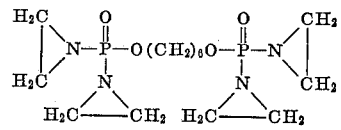

The compound was an amber colored liquid with an aziridinyl content of 41.9 percent (theoretical=44.5 percent).

Density=1.218 g./ml. at 25° C.
$\eta_D{}^{24.5}$=1.4980

EXAMPLE III

Three grams of phosphorus oxychloride dissolved in 100 milliliters of 1,4-dioxane was placed in a reaction vessel. To this was added dropwise 200.0 grams of HO(C$_2$H$_4$O)$_n$ C$_2$H$_4$OH ("Polyglycol E 20,000"; $n$ is a number such that the molecular weight of the polyethylene glycol is approximately 20,000) dissolved in 700 milliliters of 1,4-dioxane over a period of 1.5 hours. The temperature was maintained at about 30° C. The excess POCl$_3$ and HCl formed in the reaction was removed with reduced pressure. The resulting polyethylene glycol diester of phosphorodichloridic acid (202.3 grams) was added dropwise over a one hour period to a reaction vessel containing 500 milliliters of 1,4-dioxane, 4.0 grams of ethyleneimine and 11.0 grams of triethylamine. The temperature of the reaction vessel and contents was held at 25° C. The reaction mixture was digested for an additional one-half hour and then filtered. The final product was recovered as a white crystalline solid (melting point 58°–59° C.) by the addition of n-heptane to the filtrate. The yield of product:

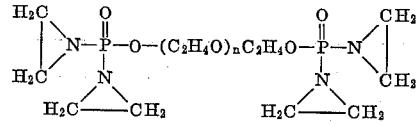

($n$ is a number such that the molecular weight of HO—(C$_2$H$_4$O)$_n$ C$_2$H$_4$OH is approximately 20,000) was 88 percent of the theoretical yield (178.4 grams).

EXAMPLE IV

In a manner similar to Example I, 233 grams of "Polyglycol 11–80" (an adduct of propylene oxide and glycerol of the formula

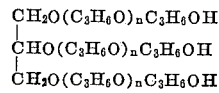

wherein each $n$ is a number which may be the same or different and is such that the average molecular weight is 700) was reacted with 300 grams of phosphorus oxychloride. The HCl formed in the reaction and excess POCl$_3$ were removed under reduced pressure. The resulting "Polyglycol 11–80" triester of phosphorodichloridic acid was obtained as a clear viscous liquid. This product was analyzed for chlorine (Volhard method):

Found—20.4 percent by weight
Theoretical—20.3 percent

This compound (174 grams) was diluted with 400 milliliters of benzene and added dropwise over a period of one hour to a reactor containing 500 milliliters of benzene, 51.6 grams of ethyleneimine and 121.3 grams of triethylamine. The mixture was held at 5° C. during the addition and for a one-half hour period after the addition. The mixture was then filtered and excess ethyleneimine, triethylamine and benzene were evaporated off under reduced pressure. The final compound was a thick, viscous, yellow liquid with an actual aziridinyl content of 21.7 percent by weight (theoretical=23.1 percent). The recovered hexa-aziridinyl compound (each $n$ is such that the molecular weight ~1090):

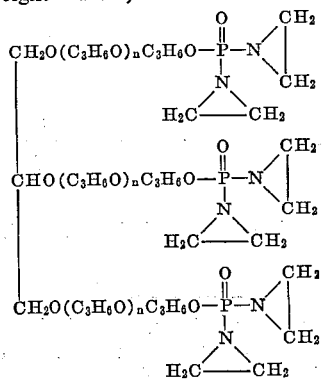

weighed 142.0 grams (78 percent by weight of the theoretical yield).

Density = 1.115 g./ml. at 25° C.
$\eta_D^{24.5} = 1.4757$

In a similar manner, other polyol reactants can be reacted with phosphorus oxyhalides and ethyleneimine (and homologs such as methyl and ethyl substituted ethylenimines, 2-methyl aziridine, 2-ethyl aziridine) to give similar products, as disclosed in Table 1.

The following example represents a typical treatment of cotton fabric using the compounds of the invention.

EXAMPLE V

A textile treating bath was made up with the following materials:

(1) 47.1 grams of the bis(1-aziridinyl)-diethylene glycol diester of phosphinic acid prepared in Example I ($C_{12}H_{24}N_4O_5P_2$), (2) 13.0 grams of a 40 percent by weight aqueous solution of zinc fluoborate, (3) 27.3 grams of a polyethylene emulsion softener ("Moropol 700," a nitrogen-free non-ionic polyethylene emulsion obtained from Moretex Chem. Products), (4) 1.0 gram of wetting agent ("Triton X-100," an alkylaryl polyether alcohol obtained from Rohm and Haas), and (5) 411.6 grams of water.

A sample of desized and scoured cotton gingham fabric was padded through this textile treating bath on a Butterworth laboratory padder (an apparatus containing an adjustable wringer mechanism). The fabric was then passed through a drying oven at 95° C. for 1.5 minutes and then a curing oven at 174° C. for 1.5 minutes. The treated fabric had a wrinkle recovery angle of 285° by the method described in ASTM, D-1295-53T.

*Table 1*

| Polyol | Final Product |
| --- | --- |
| 1. Triethylene glycol $HO(CH_2CH_2O)_2CH_2CH_2OH$ | (aziridinyl phosphinate diester structure with $-O-(CH_2CH_2O)_2-CH_2CH_2O-$ linkage) |
| 2. Dipropylene glycol $HO(C_3H_6O)_2H$ | (aziridinyl phosphinate diester structure with $-OC_3H_6-O-C_3H_6O-$ linkage) |
| 3. Polyethylene glycols of formula: $HO(C_2H_4O)_nC_2H_4OH$ wherein n is such that the molecular weight is: (a) 200 ("Polyglycol E 200"). | (aziridinyl phosphinate diester structure with $-O-(C_2H_4O)_n-C_2H_4O-$ linkage) n is a number such that the molecular weight ~460 ($C_{16}H_{32}N_4O_7P_2$). |
| (b) 400 ("Polyglycol E 400") | Same formula as (a), but n is a number such that the molecular weight ~660. |
| 4. Polypropylene glycols of formula: $HO(C_3H_6O)_nC_3H_6OH$ wherein n is a number such that the molecular weight of the glycol is approximately: (c) 250 ("Polyglycol P 250"). | (aziridinyl phosphinate diester structure with $-O-(C_3H_6O)_n-C_3H_6O-$ linkage) |
| (d) 400 ("Polyglycol P 400") | Same formula as (c), but n is a number such that the molecular weight is ~660. |
| 5. $H_2C-O(C_3H_6O)_nC_3H_6OH$<br>$HC-O(C_3H_6O)_nC_3H_6OH$<br>$H_2C-O(C_3H_6O)_nC_3H_6OH$<br>("Polyglycol 11-80"; each n is an integer such that the molecular weight is approximately 700. Prepared by reacting propylene oxide and glycerine). | Tri-(aziridinyl phosphinate) ester of the above triol |

I claim as my invention:
1. A compound of the formula

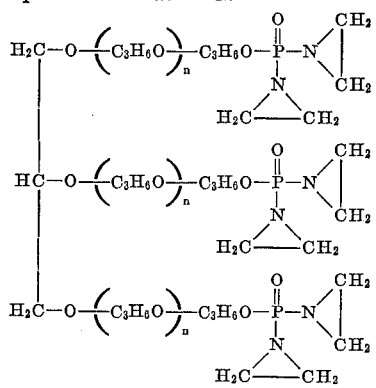

wherein each $n$ is an integer from 1 to about 150.

2. The compound

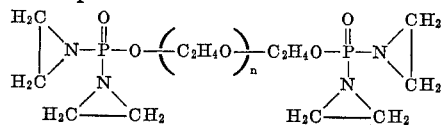

wherein $n$ is a number such that the molecular weight of $HO(C_2H_4O)_nC_2H_4OH$ is approximately 20,000.

References Cited by the Examiner
UNITED STATES PATENTS

| | | | |
|---|---|---|---|
| 2,606,901 | 8/1952 | Parker et al. | 260—2 |
| 2,886,538 | 5/1959 | Chance et al. | 260—2 |
| 3,138,585 | 6/1964 | Ratz | 260—2 |

FOREIGN PATENTS

| | | |
|---|---|---|
| 475 | 1/1958 | Japan. |
| 3,068 | 4/1959 | Japan. |
| 3,579 | 4/1961 | Japan. |

OTHER REFERENCES

Protsenko et al.: "Ukr. Khim. Zh.," vol. 28, 1962, pp. 719–20 (abstracted in 59 Chem. Abstracts 488–9 (1963)).

SAMUEL H. BLECH, *Primary Examiner.*

MURRAY TILLMAN, *Assistant Examiner.*